United States Patent [19]
Bourlon et al.

[11] Patent Number: 5,915,799
[45] Date of Patent: Jun. 29, 1999

[54] PRESSURE-REGULATING SOLENOID VALVE FOR A HYDRAULIC CIRCUIT

[75] Inventors: Philippe Bourlon, Aubervilliers; Werner Quirant, Pantin, both of France

[73] Assignee: Bosch Systemes de Freinage, Drancy, France

[21] Appl. No.: 08/648,115

[22] PCT Filed: Apr. 23, 1996

[86] PCT No.: PCT/FR96/00613

§ 371 Date: May 21, 1996

§ 102(e) Date: May 21, 1996

[87] PCT Pub. No.: WO97/01806

PCT Pub. Date: Jan. 16, 1997

[30] Foreign Application Priority Data

Jun. 26, 1995 [FR] France .................................... 95 07667

[51] Int. Cl.⁶ .............................. B60T 8/36; G05D 16/20; F16K 31/06
[52] U.S. Cl. ...................................... 303/119.2; 303/117.1
[58] Field of Search .................. 303/116.1, 117.1–119.2; 251/129.02, 129.14, 129.15, 129.19, 129.21; 137/625.65–625.68

[56] References Cited

U.S. PATENT DOCUMENTS

| | | | |
|---|---|---|---|
| 5,647,645 | 7/1997 | Muller et al. ........................ | 303/117.1 |
| 5,765,930 | 6/1998 | Kervagoret et al. .................. | 303/115.2 |

*Primary Examiner*—Chris Schwartz
*Attorney, Agent, or Firm*—Leo H. McCormick, Jr.; Warren Comstock

[57] ABSTRACT

A pressure-regulating solenoid valve (100) for a hydraulic circuit having at least one generator (300) of pressurized fluid, a pressure receiver (200) and a reservoir (400) of fluid under low pressure. The solenoid valve having an electric coil (10) which interacts with first (12) and second (14) pole pieces and a magnetic body (26). The magnetic body (26) moves under the effect of an actuating force (O) generated by a magnetic field created by the electric coil (10) and a distributor element (30) interacting with a sleeve structure (28) to command communication between a duct (66) connected to the pressure receiver and one of first (54) and second (42) ducts sequentially connected to the generator (300) of pressurized fluid or the reservoir (400) of fluid under low pressure. The solenoid valve (100) has at least one reaction chamber (46) which is permanently in communication with the pressure receiver (200) for receiving a reaction force which added to the actuation force (O) generated by the actuation of coil (10). The reaction force and actuation force are counter to a force (F) generated by an elastic means (34,36) which act on the movable magnetic body (26). The sleeve structure (28) is stationary with respect to the first and second pole pieces (12,14) while the distributor element (30) slides with respect to the sleeve structure (28) in response to movement of the magnetic body (26) responding to the reaction force and actuation force.

11 Claims, 6 Drawing Sheets

PRESSURE-REGULATING SOLENOID VALVE FOR A HYDRAULIC CIRCUIT

The present invention relates to pressure-regulating solenoid valves for hydraulic circuits, more particularly but not exclusively intended for the braking circuits of motor vehicles, provided with an antilock braking system preventing the wheels from locking up under braking, or with a traction control system preventing wheelspin under acceleration.

BACKGROUND OF THE INVENTION

Current antilock braking systems employ, between a source of pressurized fluid and a pressure receiver such as a brake motor, a solenoid valve commanded by a computer on the basis of signals representing the speed of rotation of the wheels in order, in general, to relieve the pressure of the fluid in the brake motor when the computer detects imminent locking of the wheel associated with this brake motor, then to connect a second source of pressurized fluid in order to increase the hydraulic pressure in the brake motor again until imminent locking is detected again, the pressure-relief and -raising cycle then recommencing.

Likewise, known traction control systems employ a solenoid valve in order, in general, to increase the pressure of the fluid in the brake motor when the computer detects the need to brake the wheel associated with this brake motor, then to connect a second source of fluid under low pressure in order to relieve the hydraulic pressure in the brake motor until braking is necessary again, it being possible for the pressure-raising and -relieving cycle to recommence.

The solenoid valves used to command the braking pressure operate most of the time in all-or-nothing mode, one solenoid valve being used to relieve the pressure in the brake motor, and another to make the pressure in this brake motor rise again, this being for each wheel of the vehicle.

These successive phases of relieving the pressure and raising it again each last for a very short period of time and follow on rapidly from one another, which results in the solenoid valves changing state rapidly many times. This gives rise to significant noise due to the beating of the movable part of these solenoid valves, accompanied by abrupt changes in pressure in the brake motors, giving rise to transient ill-controlled conditions.

In order to avoid these drawbacks, it has since been proposed, for example in the documents FR-A-2,679,299 or FR-A-2,683,338, to use three-way solenoid valves of the proportional type. They allow, on the one hand, use of just one solenoid valve per wheel of the vehicle to be commanded and, on the other hand, they operate much more quietly.

Such proportional solenoid valves nevertheless still have the drawback of exhibiting a significant overall size. Indeed, these solenoid valves are made up most of the time of a purely electrical part including the electrical coil, the pole pieces and a movable magnetic core, and a purely hydraulic part including a distributor slide valve sliding in a bore or in a sleeve formed in a body including various hydraulic ducts, the connection between these two parts being effected by a push rod integral with the movable magnetic core on which the distributor slide valve comes to bear.

Such an in-line arrangement of the electrical and hydraulic parts gives known solenoid valves longitudinal dimensions which may make it difficult, or even impossible, to install them in the event of the space given over to them being too limited.

SUMMARY OF THE INVENTION

The object of the present invention is therefore to propose a pressure-regulating solenoid valve which exhibits a reduced overall size, and to do so without increasing either the difficulties of manufacture or consequently the cost, and the operation of which is reliable under all circumstances.

To this end, the invention proposes a pressure-regulating solenoid valve for a hydraulic circuit comprising at least one generator of pressurized fluid, a pressure receiver and a reservoir of fluid under low pressure, the solenoid valve including an electrical coil interacting with two pole pieces, a magnetic body which can move under the effect of an actuating force generated by a magnetic field created by the electrical coil, and a distributor element interacting with a sleeve structure in order to command the communication between a duct connected to the pressure receiver and one or other of ducts connected to the generator of pressurized fluid and to the reservoir of fluid under low pressure, the solenoid valve including at least one reaction chamber permanently communicating with the pressure receiver and determining a reaction force which is added to the actuating force generated by the coil, counter to the force generated by an elastic means on the movable magnetic body.

Such pressure-regulating solenoid valve is known for example from documents DE-A-4 206 210 and U.S. Pat. No. 5,248,191.

According to the present invention, the sleeve structure is stationary with respect to the pole pieces, the distributor element sliding inside the sleeve structure and being capable of being set into motion by the movable magnetic body sliding around the sleeve structure.

According to one embodiment, the solenoid valve has a negative characteristic, that is to say that a reduction in the pressure in the pressure receiver corresponds to an increase in the current flowing through the coil.

According to a second embodiment, the solenoid valve has a positive characteristic, that is to say that an increase in pressure in the pressure receiver corresponds to an increase in the current flowing through the coil.

The invention will be better understood and further objects, features and advantages thereof will emerge more clearly from reading the description which follows of a preferred embodiment, given by way of non-limiting example and with reference to the appended drawing.

DETAILED DESCRIPTION OF THE INVENTION

Figure 1:
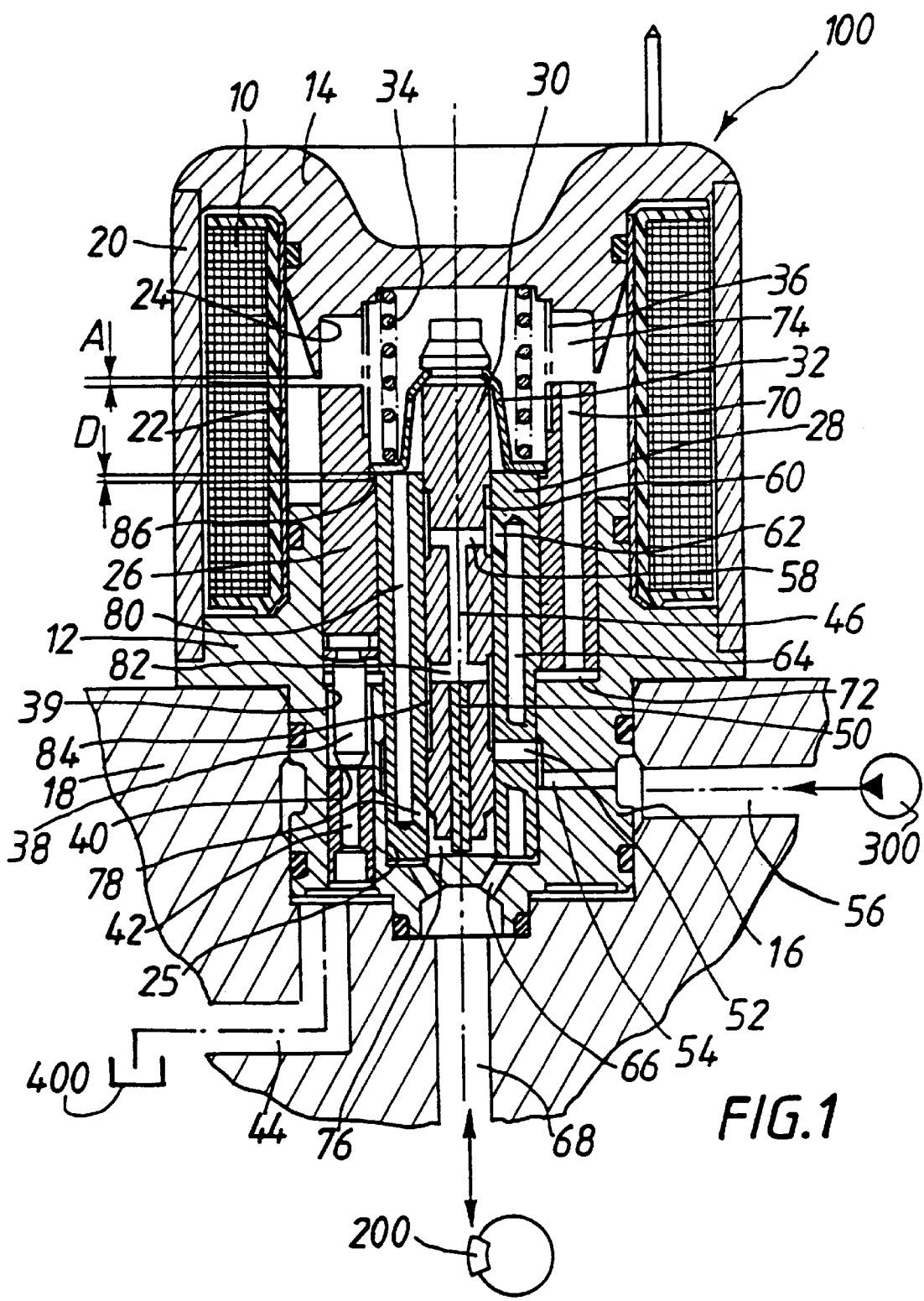
FIG. 1 represents diagrammatically in section one embodiment of a solenoid valve in accordance with the present invention.

In the various figures, the corresponding elements are identified by the same reference numeral, possibly with a "prime" added, and/or increased by 100.

The solenoid valve represented in FIG. 1, and denoted overall by the reference 100, is intended to be inserted in a hydraulic circuit in order to modulate the pressure in a pressure receiver 200 by connecting the latter either to a generator 300 of pressurized fluid or to a reservoir 400 of fluid under low pressure, under the command of a computer or of a microprocessor (which are not represented).

The solenoid valve 100 includes an electrical coil 10 capable of causing a magnetic flux to flow in the two pole pieces 12 and 14, the pole piece 12 for example being formed with an axial extension 16 serving as a base for fastening the solenoid valve 100 to a support 18. The coil 10 is situated in a volume delimited externally by a cylindrical casing 20 made of magnetic material and internally by a cylindrical sleeve tube 22 made of nonmagnetic material, seals providing sealing between the sleeve tube 22 and each of the pole pieces 12 and 14.

Thus assembled, the pole pieces 12 and 14 define a common internal bore 24 of which the part formed in the pole piece 12 is blind and stepped, with a smaller diameter part 25. In the larger diameter part of the bore 24 there slides a magnetic body 26 made of mild or very mild steel, which is subjected to the magnetic flux flowing through the pole pieces 12 and 14 and through the casing 20 so as to form a practically closed magnetic circuit.

The pole piece 14 is shaped so that the solenoid valve 100 has operation of the proportional type. More precisely, it is known that the coil of solenoid valves of this type exhibits the essential characteristic of being capable of providing a substantially constant load for a given current in an appreciable range of displacement of the magnetic body 26, of the order of several millimeters. This characteristic is put to good use in the present invention in order to provide the desired function of modulating the pressure by modulating the electrical current flowing through the coil 10.

A solenoid valve of this type therefore exhibits the advantage of being able to be commanded simply by varying the current flowing through the coil without causing the movable part to beat, and without giving rise to abrupt changes in pressure in the pressure receivers. What is more, such a solenoid valve may easily be commanded by a microprocessor which, for example, chops a direct current at variable frequency, or at fixed frequency and with a variable duty cycle, or alternatively by pulse-width modulation.

The magnetic body 26 is a cylindrical member which is formed with an axial bore so as to slide over a sleeve structure 28 integral with the pole piece 12 and with the base 16, for example by force-fitting into the smaller diameter part 25 of the blind stepped bore of the base 16.

The sleeve 28 is itself formed with an axial bore accommodating, with sliding, a distributor element 30, of which the end situated on the pole piece 14 side is integral with a spring plate 32.

A compression spring 34 is interposed between the pole piece 14 and the spring plate 32, so as to make the latter bear, at rest, on the end of the sleeve 28, and thus to determine the position of rest of the distributor 30 inside the sleeve 28.

One end of the magnetic body 26 is shaped so as to hold captive, with limited axial play, the head of a cylindrical element 38, the body of which can slide freely in a bore or valve passage 39 formed in the base 16.

A second compression spring 36 is interposed between the pole piece 14 and the magnetic body 26 in order to urge the latter toward a position of rest in which the magnetic body 26 places the element 38 in abutment on a component 40, sweated or forcibly mounted in the bore 39 of the base 16 and provided with an axial duct 42 emerging in a passage 44 formed in the support 18 and connected to the reservoir 400 of fluid under low pressure. In this position of rest, the element 38 therefore closes the duct 42. It thus forms a valve commanded by the magnetic body 26, which allows or which prevents communication with the reservoir 400, depending on the position of the body 26.

The distributor 30 is a cylindrical member which is formed with a blind axial bore 46 which accommodates, in almost leaktight fashion, a needle 50 bearing against the end of the bore 25 of the base 16.

A radial bore 52 is formed in the sleeve 28, and emerges in a circular groove formed in the bore 25, communicating via a radial duct 54 of the base 16 with a passage 56 of the support 18 connected to the generator 300 of pressurized fluid.

The bore 46 of the distributor 30 permanently communicates via a radial drilling 58 and a peripheral groove 60 with a radial drilling 62 made in the sleeve 28, the drilling 62 emerging in a blind axial drilling 64 of the sleeve 28. The drilling 64 communicates, via the space situated between the end of the sleeve 28 and the blind end of the bore 25, with a duct 66 formed in the base 16, itself in communication with a passage 68 of the support 18 connected to the pressure receiver 200.

An axial drilling 70 is formed in the magnetic body 26 in order to make the chambers 72 and 74, situated on either side of the body 26 and formed with the pole pieces 12 and 14 respectively, communicate with each other in a permanent and substantially unrestricted manner.

Likewise, the chamber 76, formed at the end of the distributor 30 with the blind end of the bore of the base 16, communicates with the chamber 74 by means of a radial drilling 78 and of an axial drilling 80, which are formed in the sleeve 28.

Finally, the bore 46 of the distributor 30 at rest communicates via a radial drilling 82 and a peripheral groove 84 with the bore 52, connected permanently to the generator 300 of pressurized fluid as was seen earlier.

The operation of the solenoid valve whose structure has just been described will now be explained, this solenoid valve being inserted for example in a motor vehicle wheel antilock system.

At rest, that is to say in the absence of electric current flowing through the coil 10, the various elements making up the solenoid valve occupy the position represented in FIG. 1. In particular, under the action of the spring 36 bearing on the magnetic body 26, the latter keeps the element 38 bearing on its seat 40 and prevents communication between the chamber 72 and the passage 44 toward the reservoir 400 of fluid under low pressure.

The pressurized fluid provided by the generator 300 arrives at the pressure receiver 200, a brake motor in the preferred application of the invention, via the passage 56, the duct 54, the bore 52, the groove 84, the drilling 82, the bore 46, the drilling 58, the groove 60, the drillings 62 and 64, the duct 66 and the passage 68, in order to brake the vehicle.

When the computer, by means of sensors (not represented) for sensing the speed of rotation of the wheels, detects imminent locking of the wheel associated with the brake motor 200, it then commands the increase in current in the coil 10. This current, by means of the pole pieces 12 and 14, generates a force on the magnetic body 26 which moves counter to the action of the spring 36, whose preload at rest may be quite low, but sufficient to guarantee, in the position of rest, the closure of the valve passage 38–40.

The magnetic body then moves by a distance D until a shoulder 86 comes to bear on the outer edge of the spring plate 32, which then exhibits resistance to advancement which is equal to the preload $F_0$ at rest of the spring 34. The displacement of the magnetic body 26 is further eased by the presence of the drilling 70 between the chambers 72 and 74, ensuring equality of the pressures on either side of the magnetic body 26 in all its positions and all its operating phases.

Right at the start of this displacement of the magnetic body, the element 38 is lifted off its seat 40, thus placing the reservoir 400 of fluid under low pressure in communication with the chambers 72 and 74 joined together by the drilling 70, and with the chamber 76 connected to the chamber 74 by the drillings 78 and 80.

The distance D is predetermined so that it corresponds substantially to one of the limits of the range of displacement of the magnetic body 26, mentioned earlier, and for which the operation of the solenoid valve is of the proportional type. In other words, the characteristics of the coil 10 are predetermined so that at this instant in the operation, the intensity $I_0$ of the current flowing through the coil 10 generates on the magnetic body 26 a force $\Phi_0$ which is equal to and in the opposite direction from the force $F_0$. For any value I of intensity of the current greater than $I_0$, the magnetic body 26 will be subjected to a force $\Phi$ which is proportional to the magnitude $(I-I_0)$.

The magnetic body 26 will then be able to compress the spring 34 by an amount d, while having to overcome a resistive force F, greater than $F_0$, and proportional to the amount d of compression of the spring 34. The stiffness of the spring 34 will therefore be predetermined in order to balance the forces F and $\Phi$ on the magnetic body 26 and thus obtain optimum operation of the solenoid valve.

Under these conditions, with the intensity of the current increasing in the coil 10, the magnetic body 26 moves, compressing the spring 34, and carrying the distributor 30 along with it in its movement, via the spring plate 32, so that the communication between the bore 52 and the groove 84 is interrupted, as is the supply of pressurized fluid to the brake motor 200 by the generator 300.

With the intensity of the current further increasing, an additional displacement of the magnetic body 26 and of the distributor 30 brings the groove 60 into communication with the chamber 74. The brake motor 200 therefore finds itself in communication with the reservoir 400 of fluid under low pressure via the passage 68, the duct 66, the drillings 64 and 62, the groove 60, the chamber 74, the drilling 70, the chamber 72, and the valve passage 38-40 which is then open.

The pressure in the brake motor 200 can then decrease, which causes the risk of the wheel associated with the brake motor 200 locking to disappear.

What is more, the groove 60 of the distributor 30 is dimensioned so that in all positions of the distributor 30 and of the magnetic body 26, it communicates with the drilling 62. As a result, the bore 46 is in permanent communication with the brake motor 200 via the drilling 58, the groove 60, the drillings 62 and 64, the duct 66 and the passage 68. The pressure exerted in the bore 46 on the distributor 30, on the cross section of the latter corresponding to the cross section of the needle 50, is therefore always equal to the pressure prevailing in the brake motor 200. The bore 46 thus constitutes a hydraulic reaction chamber, in interaction with the needle 50, sliding in almost leaktight fashion in the bore 46.

The effect of this is that the movement of the magnetic body 26 and of the distributor 30, produced by the current flowing in the coil 10, is favored by the hydraulic reaction in the reaction chamber 46 which creates a force which adds to the one created by the coil 10, and opposes the one which the spring 34 exerts.

When the intensity of the current increases, the pressure in the brake motor 200 decreases. As a result, the hydraulic reaction force due to the reaction chamber 46 also decreases, which thus facilitates the action due to the coil 10.

When the computer, in this phase of operation of the anti-lock system, detects that the wheel associated with the brake motor 200 has acquired too great a speed of rotation, it commands a decrease in the current flowing in the coil 10. The force $\Phi$ then becomes less than the force F, so that the action of the spring 34 becomes preponderant and pushes the magnetic body 26 and the distributor 30 back in the direction of their initial position of rest.

In this movement, the communication between the chamber 74 and the groove 60 is firstly interrupted, as is the communication of the brake motor 200 with the reservoir 400. Then, with the intensity of the current further decreasing, an additional displacement of the distributor 30 brings the groove 84 into communication with the bore 52. The generator 300 then finds itself again in communication with the brake motor 200, so that the pressure in the latter can then increase.

The pressure in the reaction chamber 46 also increases, so that the hydraulic reaction force due to the reaction chamber 46 increases, opposing the action of the spring 34 and here again facilitating the action due to the coil 10.

The process which has just been described is reproduced if the tendency of the wheel to lock persists, this being so until the vehicle is completely brought to rest or until the driver of the vehicle has ceased the braking action. The computer then interrupts the excitation of the coil 10, so that the distributor 30 and the magnetic body 26 return to their initial positions of rest, both being urged firstly by the spring 34 until the spring plate 32 comes to bear on the end of the sleeve 28, then the magnetic body 26 being urged by the spring 36 until the magnetic body 26 places the element 38 in abutment on its seat 40.

It can thus be understood that by suitably modulating the intensity of the current flowing in the coil 10, the magnetic body 26 assumes a position which is a function of the pressure prevailing in the reaction chamber 46, and therefore in the brake motor 200. It is thus possible to apply to the brake motor 200 exactly the desired pressure, proportional to the intensity of the current flowing in the coil 10.

It can thus clearly been seen that a solenoid valve has been produced whose overall size is reduced to a large extent by virtue of the arrangement of the fluid-distribution system inside the electromagnet coil.

This distribution system is made up of the stationary sleeve 28, inside which the distributor 30 slides, and around which the magnetic body 26 slides in order to command the movement or the position of the distributor 30.

This solenoid valve moreover exhibits numerous advantages. Indeed, it has been seen that the base 16 includes both the duct 42 for connecting with the reservoir 400, the duct 66 for connecting with the brake motor 200 and the duct 54 for connecting with the generator 300. The presence of these three ducts in the same base makes it possible to obtain a solenoid valve which need only be inserted in its support 18 to render it immediately operational without any further operation. To this end provision may be made for the electrical power connection for the coil 10 also to be provided on the support 18. Furthermore, the generator 300 itself may be incorporated into this support 18, drawing the fluid it needs from the passage 44, which makes it possible to shorten and to simplify the various hydraulic connections.

Furthermore, the sleeve 28 is fixed into the pole piece 12 and in particular provides guidance for the magnetic body 26 in its sliding. Such a design makes it possible very easily and very precisely to gain control over the functional clearances or air gaps, such as the radial distance between the external surface of the magnetic body 26 and the bore 24, and the axial distance A at rest between the internal end of the pole piece 14 and the terminal surface of the magnetic body 26.

It is thus possible to gain control over these values without employing guide tubes made of nonmagnetic material as is commonplace in solenoid valve technology. These tubes are necessarily very slender, and therefore tricky to produce and to handle, and what is more they induce not insignificant parasitic friction which are the cause of hysteresis phenomena which are difficult to control. The present invention, by making it possible to dispense with the use of these tubes, thus gives a much simpler and more reliable solenoid valve than those of the prior art, with markedly reduced manufacturing and maintenance costs.

Figure 2:
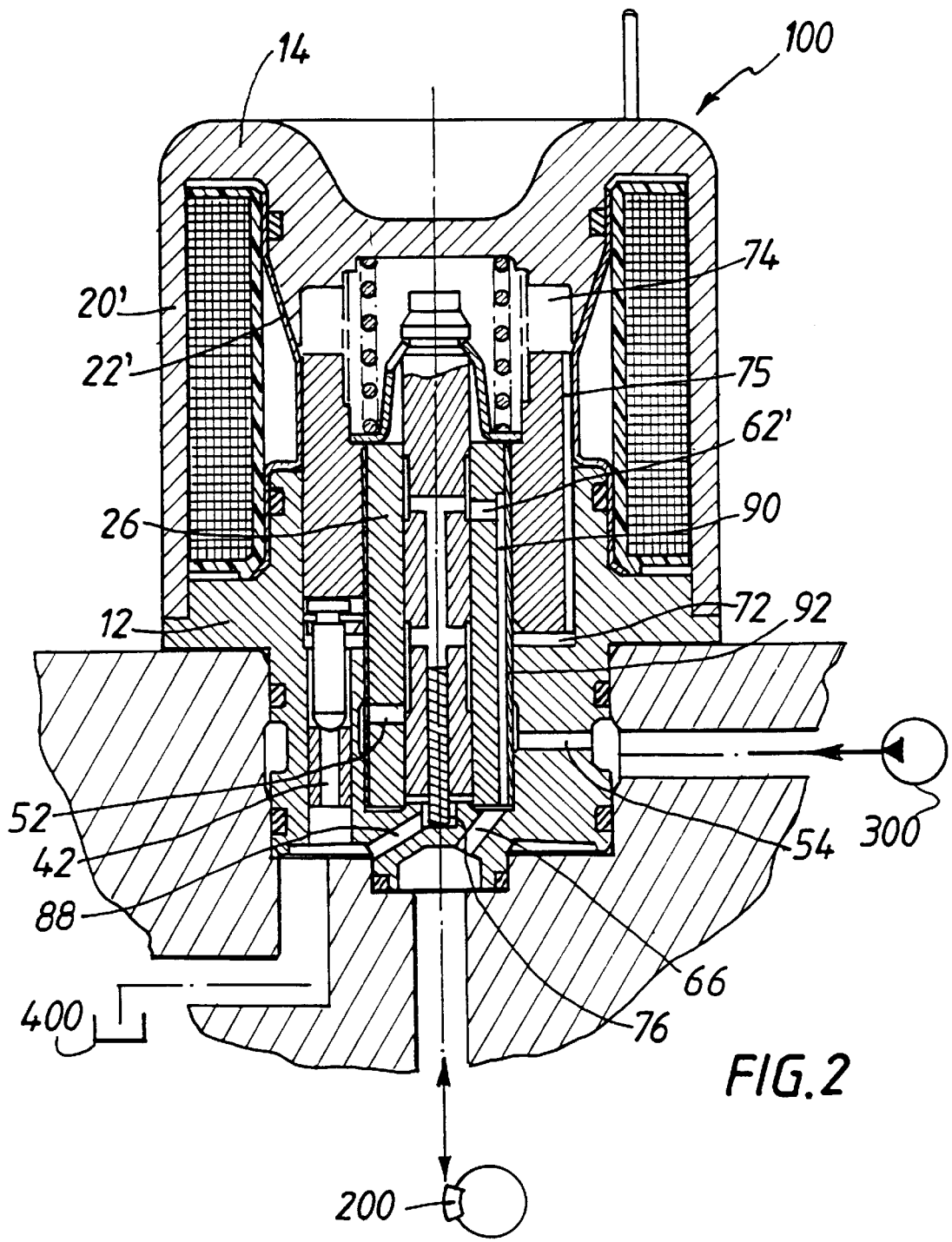
FIG. 2 represents diagrammatically in section a first variation on the embodiment of FIG. 1.
Figure 3:
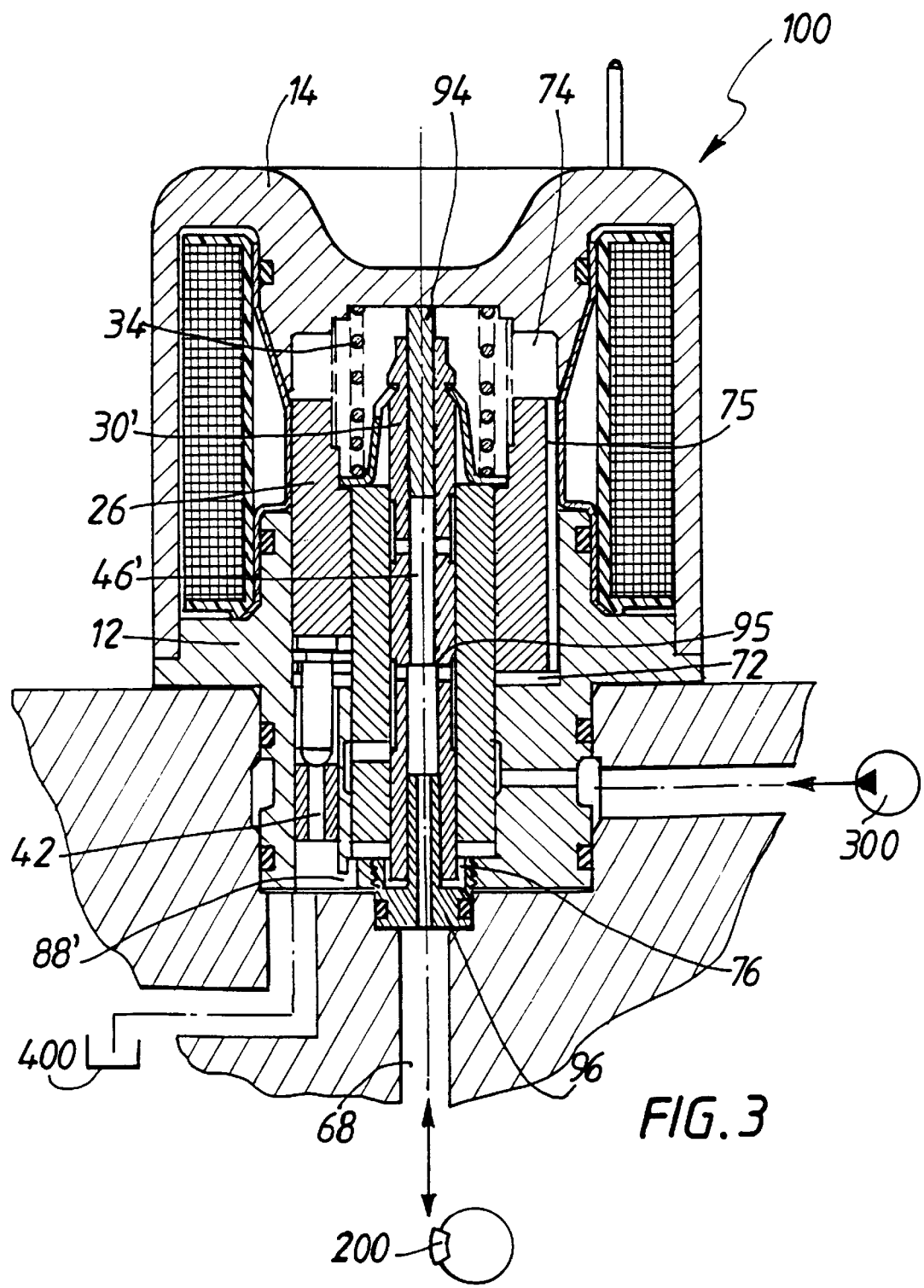
FIG. 3 represents diagrammatically in section a second variation on the embodiment of FIG. 1.

Various modifications and variations may be made to the solenoid valve which has just been described, and which modifications and variations are represented in FIGS. 2 and 3.

With reference to FIG. 2, it can be seen that the pole piece 14 and the casing 20' can be made as a single piece, so as to facilitate the centering of this pole piece 14 with respect to the pole piece 12. It can also be seen that the sleeve tube made of nonmagnetic material 22' can be given a shape which matches the shapes of the pole pieces 12 and 14 so as to limit the volume of fluid used, and facilitate the bleeding of the solenoid valve.

Furthermore, it is possible to avoid making the drillings 78 and 80 in the sleeve 28 by connecting the chamber 76 directly to the duct 42 by means of a radial drilling 88. Furthermore, balance between the pressure in the chambers 72 and 76 is obtained by means of axial grooves 75 made at the external periphery of the magnetic body 26. Such grooves are actually easier to machine than longitudinal drillings.

It can also be seen in FIG. 2, that it is also possible to avoid making the drillings 62 and 64 in the sleeve 28. In order to do this, axial grooves 90 are made at the external periphery of the sleeve 28, and a sheath 92 is located around the sleeve 28. The grooves 90 thus cause the duct 66 to communicate with a radial drilling 62' in the sleeve 28, serving the same purpose as the drilling 62 of FIG. 1.

Openings are made in the sheath 92 to cause the duct 54 for connecting with the generator 300 to communicate with the radial bore 52 in the sleeve 28.

It is thus possible to simplify to a large extent the machining of the sleeve 28. The operation of the solenoid valve of FIG. 2 is moreover completely identical to that of the solenoid valve of FIG. 1 and will therefore not be explained in detail.

Represented in FIG. 3 is a variation on the previous embodiments. The distributor 30 here is formed with a stepped axial through bore 46'. The distributor 30' slides in leaktight fashion via its smaller diameter part around a needle 94 providing sealing between the chamber 74 and the bore 46'. The needle 94 bears against the pole piece 14, or is integral with the latter, for example by screwing.

The distributor 30' moreover slides in leaktight fashion via its larger diameter part about a hollow needle 96 integral with the pole piece 12 for example by screwing. The hollow needle 96 provides sealing between the chamber 76 and the bore 46', while allowing communication between this bore 46' and the passage 68 connected to the pressure receiver 200. The chamber 76 is in permanent communication with the duct 42 and the reservoir 400 via a drilling 88' in the pole piece 12. A radial shoulder 95 separates the two parts of smaller and of larger diameter, of the bore 46'.

The operation of the solenoid valve represented in FIG. 3 is identical to that described in relation to FIG. 1. In particular, the pressure exerted in the bore 46' on the distributor 30' on the cross section of the latter corresponding to the cross section of the radial shoulder 95 is always equal to the pressure prevailing in the brake motor 200. The bore 46' thus constitutes a hydraulic reaction chamber by means of the shoulder 95.

As before, the effect of this is that the movement of the magnetic body 26 of the distributor 30, produced by the current flowing through the coil 10, is favored by the hydraulic reaction in the reaction chamber 46' which reaction creates a force which is added to the one created by the coil 10, and opposes that exerted by the spring 34, which facilitates the action due to the coil 10.

Figure 4:
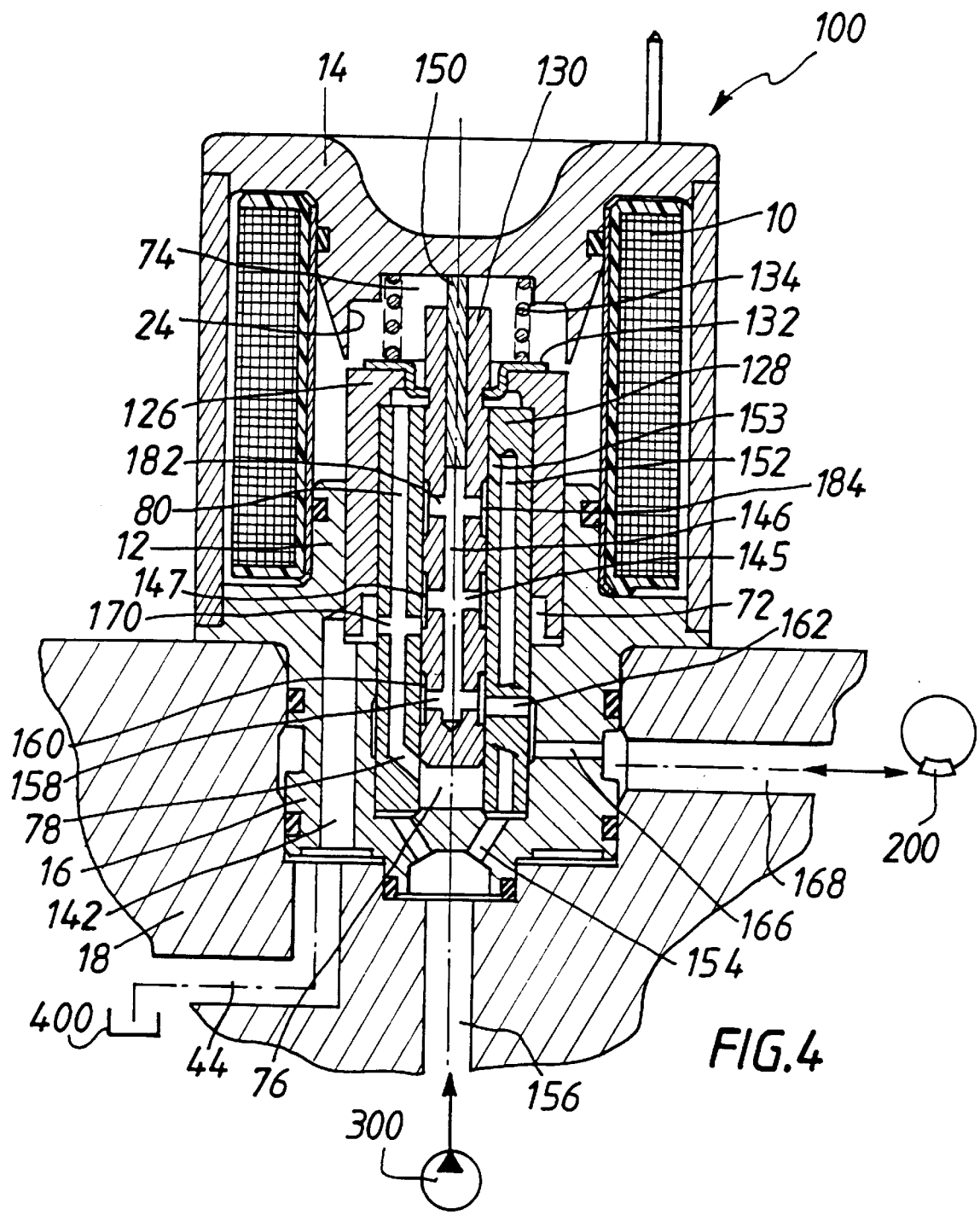
FIG. 4 represents diagrammatically in section a second embodiment of a solenoid valve in accordance with the present invention.

FIG. 4 represents a second embodiment of the solenoid valve according to the present invention.

As in the first embodiment, the distributor 130 slides in the sleeve 128, being set in motion by the movable magnetic body 126 sliding around the sleeve 128, integral with the pole piece 12 and with the base 16. It is formed with a blind bore 146 which accommodates in almost leaktight fashion a needle 150 bearing on the pole piece 14 in the end of the bore 24.

The chambers 74 and 76 at the ends of the distributor 130 communicate with each other by means of the axial drilling 80 and radial drilling 78 which are formed in the sleeve 128. A radial drilling 170 in the sleeve 128 causes the axial drilling 80 to communicate with the chamber 72, the latter being in permanent communication with the reservoir 400 via the duct 142 and the passage 44. The chambers 72, 74 and 76 therefore permanently communicate with each other and with the reservoir 400.

The bore 146 of the distributor 130 permanently communicates via a radial drilling 158 and a peripheral groove 160 with a radial drilling 162 made in the sleeve 128, the drilling 162 communicating with a duct 166 formed in the base 16, itself in communication with a passage 168 of the support 18 connected to the pressure receiver 200.

The bore 146 can communicate with the generator 300 of pressurized fluid by means of a radial drilling 182, a peripheral groove 184, a radial drilling 153 and an axial drilling 152 which are made in the sleeve 128, the duct 154 and the passage 156.

Finally, the bore 146 is connected to the reservoir 400 of fluid under low pressure by means of a radial drilling 145 and of a peripheral groove 147 which at rest communicates with the radial drilling 170 of the sleeve 128.

The operation of the solenoid valve according to this second embodiment will now be explained, this solenoid valve being inserted for example in an automatic braking system in order to fulfill various functions, such as a traction control for preventing wheelspin under acceleration or an anti-lock braking system for a motor vehicle.

At rest, all the elements occupy the position represented in FIG. 4. It was seen earlier that in this position the end chambers 72, 74 and 76 are connected to the reservoir 400 and that the reaction chamber 146 also communicates with the reservoir 400 via the radial drilling 145, the peripheral groove 147 and the radial drilling 170 emerging in the chamber 172.

The pressure receiver 200 is therefore connected to the reservoir 400 of fluid under low pressure by means of the passage 168, the duct 166, the radial drilling 162, the groove 160 of the distributor 130, the drilling 158 and the reaction chamber 146.

When the computer commands an increase in the current flowing in the coil 10, this current, by means of the pole pieces 12 and 14, generates a force on the magnetic body 126 which then moves counter to the action of the spring 134, and which carries the distributor 130 along with it in its movement by virtue of the spring plate 132.

The current increasing in the coil 10 gives rise to the displacement of the distributor 130 counter to the action of the spring 134. This displacement gives rise to the displacement of the groove 147 in order to interrupt the communication between it and the drilling 170. The reaction chamber 146 and the pressure receiver 130 then find themselves isolated from the reservoir 400.

The intensity of the current flowing through the coil 10, and the position of the distributor 130 therefore fall within the ranges of values for which there is proportionality between the force exerted on the distributor 130 and the control current.

The computer can therefore modulate the current within this range of values. If the intensity of the current increases, the distributor 130 is urged against the action of the spring 134, so that the groove 184 of the distributor 130 comes into communication with the drilling 153 connected to the generator 300.

As in the first embodiment, the groove 160 of the distributor 130 is dimensioned so that, in all the positions of the distributor 130 and of the magnetic body 126, it communicates with the drilling 162 for communication with the brake motor 200 so that the reaction chamber 146 always communicates with the brake motor 200. The pressure exerted in the bore 146 on the distributor 130 on the cross section of the latter corresponding to the cross section of the needle 150 is therefore always equal to the pressure prevailing in the brake motor 200. The bore 46 likewise constitutes a hydraulic reaction chamber in interaction with the needle 50 sliding in almost leaktight fashion in the bore 46.

However, according to this embodiment., the reaction force thus created is added to the force exerted by the spring 134, and opposes the actuating force generated by the coil 10.

Thus, by modulating the current flowing through the coil 10, the distributor 130 will adopt a position which is a function of the pressure prevailing in the reaction chamber 146 and it will thus be possible, by judiciously driving this current, to apply the desired fluid pressure to the brake motor 200. Indeed the hydraulic reaction generated in the reaction chamber 146 will then automatically open or close the communications between the brake motor 200 and the generator 300 or the reservoir 400 for each given value of the intensity of the current flowing through the coil 10.

Thus, if the intensity of the current decreases, the force exerted by the magnetic body 126 on the distributor 130 decreases and the latter is urged toward its position of rest by the spring 134 so that the communication between the groove 184 of the distributor 130 and the drilling 153 is interrupted, and so that the communication between the groove 147 and the drilling 170 is reestablished. The reaction chamber 146 and the pressure receiver 200 are therefore connected to the reservoir 400, and the pressure in the pressure receiver 200 can therefore decrease.

It can thus be seen that the vehicle can be braked under the effect simply of an electrical command from the computer, the latter modulating, for example by chopping, the intensity of the current in the coil 10 in order to modulate the pressure in the receiver 200 correspondingly.

It can thus be seen that with a solenoid valve according to this second embodiment, when the intensity of the current in the coil 10 increases, the pressure in the brake motor 200 increases proportionately. Such a solenoid valve thus makes it possible to provide braking by a purely electrical command, which may exhibit all the desired characteristics, stored in memory in the computer. It may for example fulfill the function of preventing the wheels from locking, preventing wheelspin on acceleration, holding the vehicle on a slope, maintaining constant speed or constant distance with respect to the vehicle in front, these examples not being exhaustive.

Figure 5:
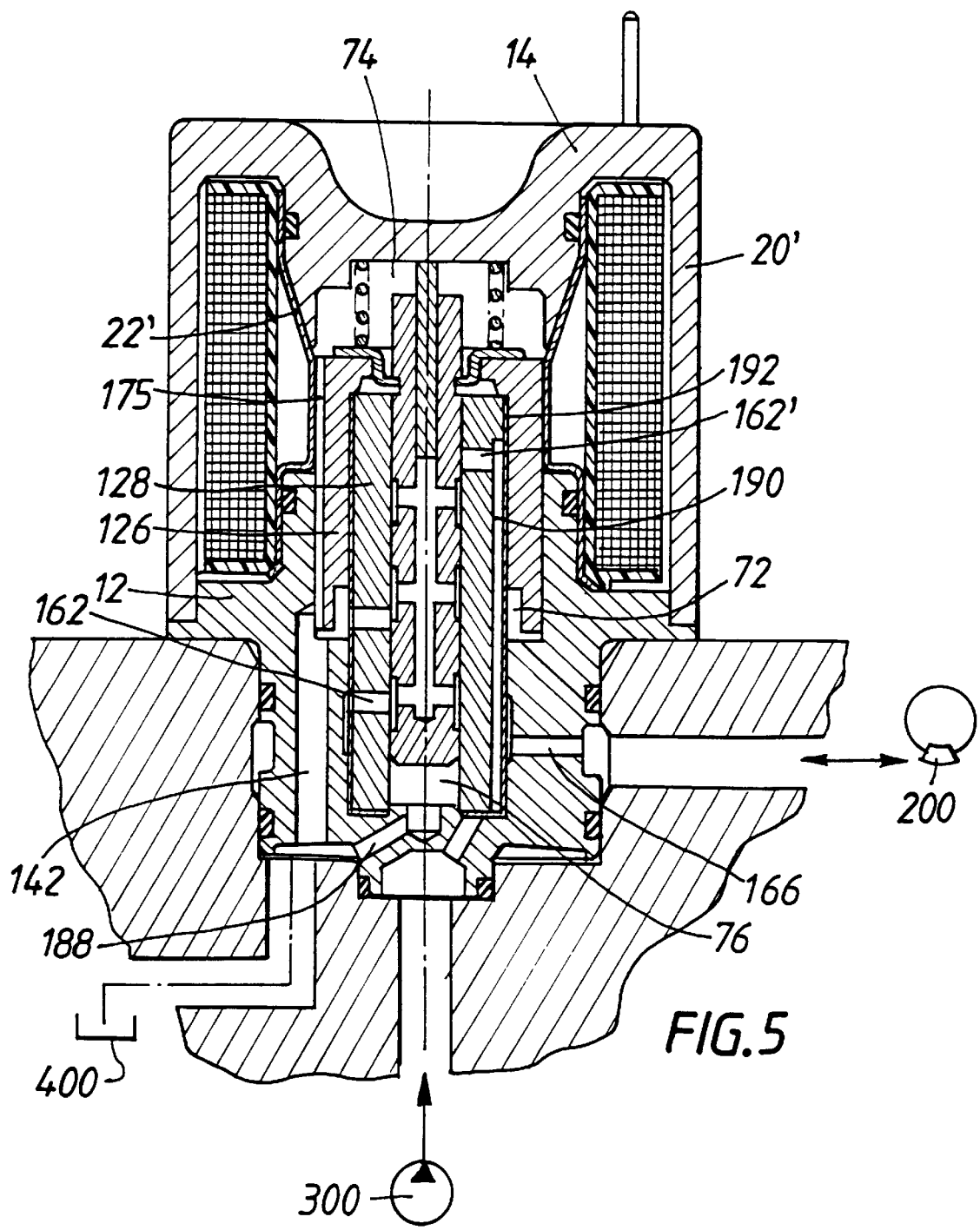
FIG. 5 represents diagrammatically in section a first variation on the embodiment of FIG. 4.
Figure 6:
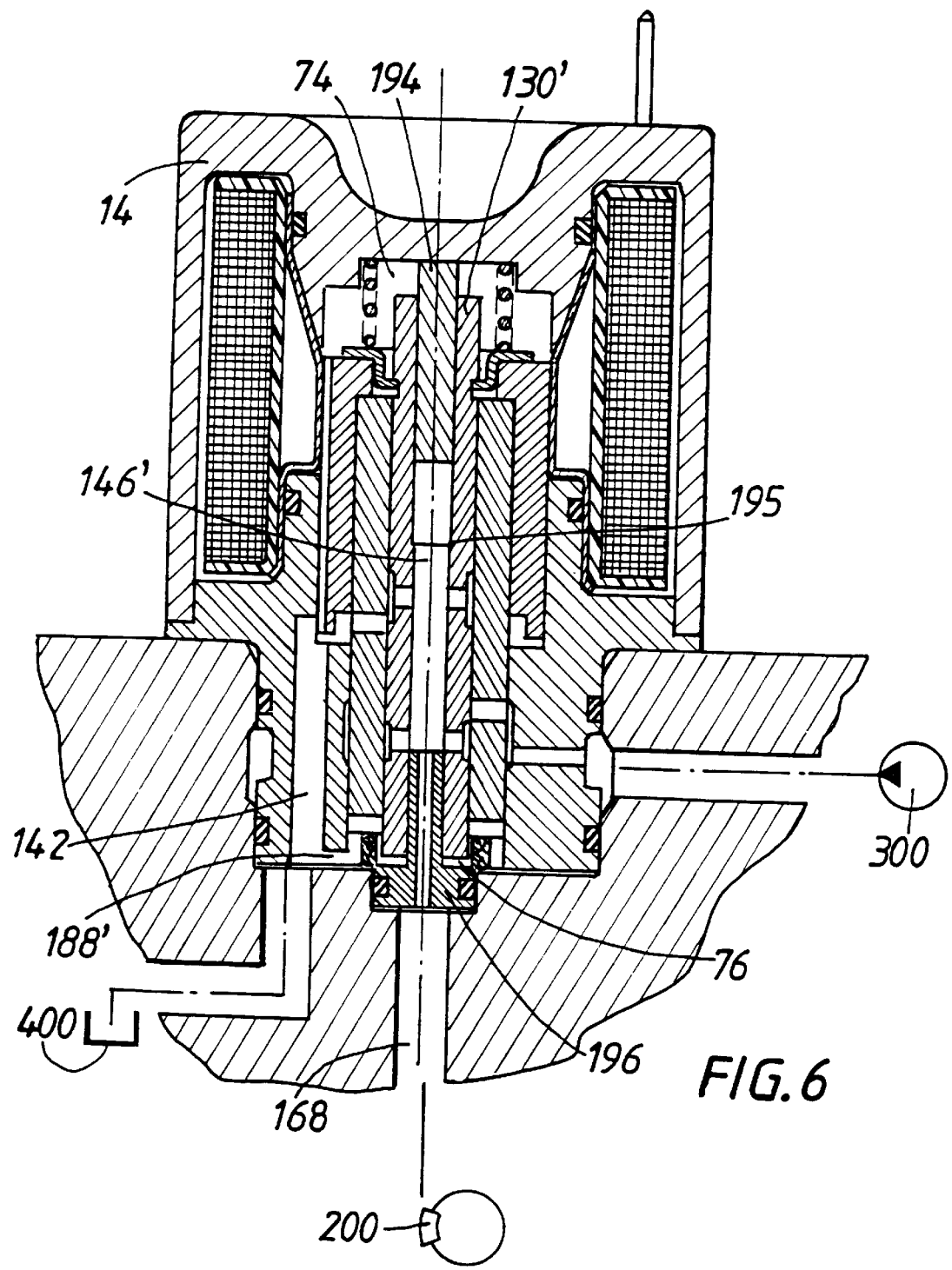
FIG. 6 represents diagrammatically in section a second variation on the embodiment of FIG. 4.

As for the first embodiment, it is possible to make various modifications to and variations on the solenoid valve which has just been described, and which modifications and variations are represented in FIGS. 5 and 6.

Thus, as can be seen in FIG. 5, the pole piece 14 and the casing 20' are made as a single piece, and the sleeve tube 22' made of nonmagnetic material may be given a shape matching the shapes of the pole pieces 12 and 14.

Likewise, it is possible to avoid making the drillings 78 and 80 in the sleeve 128 by connecting the chamber 76 directly to the duct 142 by means of a radial drilling 188. The chambers 72 and 74 are placed in permanent communication with each other and with the reservoir 400 by means of axial drillings 175 made at the external periphery of the magnetic body 126.

It can also be seen in FIG. 5 that it is also possible to avoid making the drillings 152 and 153 in the sleeve 128 by making axial grooves 190 at the external periphery of the sleeve 128, a sheath 192 being located around the sleeve 128. The grooves 190 thus make the duct 166 communicate with a radial drilling 162' in the sleeve 128, fulfilling the same function as the drilling 153 of FIG. 4.

Openings are made in the sheath 192 to make the duct 166 for connection with the reservoir 200 communicate with the radial bore 162 in the sleeve 128.

The machining of the sleeve 128 can thus be simplified to a large extent. The operation of the solenoid valve of FIG. 5 is moreover completely identical to that of the solenoid valve of FIG. 4 and will therefore not be explained in detail.

FIG. 6 represents another variation on the embodiments represented in FIGS. 4 and 5. The distributor 130' is formed with a stepped axial through bore 146'. The distributor 130' slides in leaktight fashion via its larger diameter part around a needle 194 providing sealing between the chamber 74 and the bore 146'. The needle 194 bears against the pole piece 14 or is integral with the latter for example by screwing.

The distributor 130' moreover slides in leaktight fashion via its smaller diameter part around a hollow needle 196 integral with the pole piece 12 for example by screwing. The hollow needle 196 provides sealing between the chamber 76 and the bore 146' while allowing communication between this bore 146' and the passage 168 connected to the pressure receiver 200. The chamber 76 is in permanent communication with the duct 142 and the reservoir 400 via a drilling 188' in the pole piece 12. A radial shoulder 195 separates the two parts of smaller and of larger diameter of the bore 146'.

The operation of the solenoid valve represented in FIG. 6 is identical to that described with relation to FIG. 4. In particular, the pressure exerted in the bore 146' on the distributor 130' on the transverse section of the latter corresponding to the transverse section of the radial shoulder 195 is always equal to the pressure prevailing in the brake motor 200. The bore 146' thus constitutes a hydraulic reaction chamber by means of the shoulder 195.

As was seen earlier, by modulating the current flowing through the coil 10, the distributor 130' will adopt a position which is a function of the pressure prevailing in the reaction chamber 146', and it will thus be possible, by judiciously driving this current, to apply the desired fluid pressure to the brake motor 200, the hydraulic reaction generated in the reaction chamber 146' on the shoulder 195 will then automatically open or close the communications between the brake motor 200 and the generator 300 or the reservoir 400 for each given value of the intensity of the current flowing through the coil 10.

The solenoid valve produced according to this second embodiment exhibits the same advantages as those of the first embodiment: the presence of the three ducts for linking with the brake motor 200, the generator 300 and the reservoir 400 makes it possible to obtain a solenoid valve which need merely be inserted into its support 18 to make it immediately operational without any further operation, this simplifying installation and maintenance operations. By arranging, as represented, one of these ducts along the axis of the solenoid valve, one of these ducts axially offset, and the last duct arranged radially, the angular position of the solenoid valve about its axis may be arbitrary, which still further simplifies its installation on the support 18. It will be possible to incorporate into this support 18 the generator 300 itself, drawing the fluid it requires from the passage 44, which makes it possible to shorten and to simplify the various hydraulic connections. Furthermore, since the chambers 72, 74 and 76 at the ends of the magnetic body and of the distributor are joined together and to the reservoir 400 of fluid under low pressure, the displacement of the moving parts under the action of the force generated by the current flowing through the coil 10 is thus facilitated. The electrical consumption of the solenoid valve is low as a result of this.

We claim:

1. A pressure-regulating solenoid valve for a hydraulic circuit comprising at least one generator of pressurized fluid, a pressure receiver and a reservoir of fluid under low pressure, said solenoid valve including an electrical coil interacting with first and second pole pieces, a magnetic body which moves under the effect of an actuating force generated by a magnetic field created by said electrical coil, and a distributor element interacting with a sleeve structure for commanding the communication of fluid through a first passageway connected to said pressure receiver and for sequentially connecting one of second and third passageways with said generator of pressurized fluid and to said reservoir of fluid under low pressure, said solenoid valve including at least one reaction chamber which is in unrestricted communication with said pressure receiver and is selectively in communication with said generator of pressurized fluid for developing a reaction force which is added to said actuating force generated by said coil, said reaction force and actuating force being counter to a force generated by an elastic means acting on said movable magnetic body, said sleeve structure being stationary with respect to said first and second pole pieces, said distributor element sliding inside the sleeve structure to control the flow of fluid to said hydraulic circuit, characterized in that said distributor element is actuated by movement of said magnetic body sliding within said sleeve structure; said magnetic body, said first pole piece and distributor element defining a first end chamber within said solenoid valve; said magnetic body and said second pole piece defining a second end chamber within said solenoid valve; and said distributor element and said second pole piece defining a third end chamber within said solenoid valve, said first and second end chambers being in substantially unrestricted communication for ensuring equality of fluid pressure across said magnetic body while said first and third end chambers are in substantially unrestricted communication for ensuring equality of fluid pressure across said distributor element..

2. The pressure-regulating solenoid valve according to claim 1, characterized in that a valve passage is formed in one of said first and second pole pieces, said elastic means acting on said magnetic body to close said valve passage in the absence of said actuating force, said magnetic body opening said valve passage when an electric current flows through said coil of said solenoid valve to develop an actuating force, said opening of said valve passage places said first, second and third end chambers in communication with said reservoir of fluid under low pressure.

3. The pressure-regulating solenoid valve according to claim 2, characterized in that said distributor element has a cylindrical body with a stepped bore there-through, said reaction chamber is formed in said stepped bore, said a cylindrical body having a radial shoulder which separates a smaller diameter section from a larger diameter section of said stepped bore, said radial shoulder of said cylindrical body having a cross section which is subjected to the pressure prevailing in said pressure receiver.

4. The pressure-regulating solenoid valve according to claim 3, characterized in that said smaller diameter section of said cylindrical body slides around a first needle which rests against one of said first and second pole pieces, and said larger diameter section of said cylindrical body slides around a second needle.

5. The pressure-regulating solenoid valve according to claim 4, characterized in that said second needle is hollow which allows constant communication between said reaction chamber and said pressure receiver.

6. The pressure-regulating solenoid valve according to claim 2, characterized in that said reaction chamber is formed in a bore of said distributor element, said distributor element retaining a needle with a first end which extends into said reaction chamber and a second end which rests against one of said first and second pole pieces, said first end of said needle having a cross section which is subjected to the pressure prevailing in said pressure receiver.

7. A pressure-regulating solenoid valve for a hydraulic circuit comprising at least one generator of pressurized fluid, a pressure receiver and a reservoir of fluid under low pressure, said solenoid valve including an electrical coil interacting with first and second pole pieces, a magnetic body which moves under the effect of an actuating force generated by a magnetic field created by said electrical coil, and a distributor element interacting with a sleeve structure for commanding the communication of fluid through a first passageway connected to said pressure receiver and for sequentially connecting one of second and third passageways to said generator of pressurized fluid and said reservoir of fluid under low pressure, said solenoid valve including at least one reaction chamber which is in permanent communication with said pressure receiver and is selective in communication with said generator of pressurized fluid for developing a reaction force which is added to said actuating force generated by said coil, said reaction force and actuating force being counter to a return force generated by an elastic means acting on said movable magnetic body, said sleeve structure being stationary with respect to said first and second pole pieces, said distributor element sliding inside of said sleeve structure to control the flow of fluid to said hydraulic circuit, characterized in that said distributor element is actuated by movement of said magnetic body sliding within said sleeve structure, said magnetic body, said first pole piece and distributor element defining a first end chamber, said magnetic body and said second pole piece defining a second end chamber; and said distributor element and said second pole piece defining a third end chamber within said solenoid valve, said first and second end chambers being in substantially unrestricted communication for ensuring equality of fluid pressure across said magnetic body, said reaction chamber being connected to said reservoir of fluid under low pressure in the absence of an actuating force being generated by said magnetic field.

8. The pressure-regulating solenoid valve according to claim 7, characterized in that said distributor element has a cylindrical body with a larger diameter section which slides on a first needle resting against said first pole piece and smaller diameter section which slides on said second needle resting against said second pole piece.

9. The pressure-regulating solenoid valve according to claim 8, characterized in that said second needle is hollow to provide said permanent communication between said reaction chamber and said pressure receiver.

10. The pressure-regulating solenoid valve according to claim 7, characterized in that said reaction chamber is formed in a bore of a cylindrical body of said distributor element, and said cylindrical body sliding on a needle which rests against one of said first and second pole pieces, said needle having a cross section of which is subjected to the pressure prevailing in said pressure receiver.

11. The pressure-regulating solenoid valve according to claim 7, characterized in that said reaction chamber is formed in a stepped bore of a cylindrical body of said distributor element, said cylindrical body having a radial shoulder for separating a smaller diameter section from a larger diameter section of said stepped bore, said cross section of said radial shoulder being subjected to the pressure prevailing in said pressure receiver.

* * * * *